(12) United States Patent
Kasuya et al.

(10) Patent No.: US 11,347,160 B2
(45) Date of Patent: May 31, 2022

(54) LIGHT EMITTING DEVICE, EXPOSURE DEVICE, AND IMAGE FORMING APPARATUS

(71) Applicant: FUJIFILM Business Innovation Corp., Tokyo (JP)

(72) Inventors: Yosuke Kasuya, Kanagawa (JP); Akihiko Endo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/151,689

(22) Filed: Jan. 19, 2021

(65) Prior Publication Data

US 2022/0091536 A1 Mar. 24, 2022

(30) Foreign Application Priority Data

Sep. 24, 2020 (JP) .............................. JP2020-160192

(51) Int. Cl.
*G03G 15/04* (2006.01)
*B41J 2/00* (2006.01)
*G06K 15/12* (2006.01)
*B41J 2/45* (2006.01)

(52) U.S. Cl.
CPC .......... *G03G 15/04054* (2013.01); *B41J 2/45* (2013.01); *G06K 15/1247* (2013.01); *G03G 2215/0409* (2013.01)

(58) Field of Classification Search
CPC ....... G03G 15/04054; G03G 15/04063; G03G 15/326; G03G 2215/0409; G03G 2215/0412; B41J 2/4473; B41J 2/45; G06K 15/1247; G06K 15/1261

USPC .................................. 399/220; 347/138, 152
See application file for complete search history.

(56) References Cited

U.S. PATENT DOCUMENTS

| 9,989,881 | B2 | 6/2018 | Kasuya et al. | |
|---|---|---|---|---|
| 10,877,431 | B1* | 12/2020 | Kodo | G03G 15/04054 |
| 2012/0075403 | A1* | 3/2012 | Nagamine | B41J 2/45 347/242 |
| 2015/0346629 | A1* | 12/2015 | Nagamine | G03G 15/0409 347/118 |

(Continued)

FOREIGN PATENT DOCUMENTS

| JP | 08104026 | A | * | 4/1996 |
|---|---|---|---|---|
| JP | 11266037 | A | * | 9/1999 |

(Continued)

*Primary Examiner* — Robert B Beatty
(74) *Attorney, Agent, or Firm* — JCIPRNET

(57) ABSTRACT

A light emitting device includes a light emitting unit in which a resin housing extending in one direction holds a light emitting element emitting light in a light emitting direction intersecting the one direction, a suppressing member that extends in the one direction and suppresses deformation of the housing caused by heat, the suppressing member having a linear expansion coefficient different from a linear expansion coefficient of the housing, and a fixing portion that fixes the housing and the suppressing member to each other at a position overlapping, in the light emitting direction, a neutral axis of the housing or the light emitting unit or a neutral axis of the suppressing member in the light emitting direction, at plural places separated away from each other in the one direction or in a state of extending in the one direction.

10 Claims, 9 Drawing Sheets

(56) References Cited

U.S. PATENT DOCUMENTS

2018/0004118 A1\* 1/2018 Kasuya ............ G03G 15/04036
2019/0361368 A1\* 11/2019 Kida ................ G03G 15/04036

FOREIGN PATENT DOCUMENTS

JP    2003098314 A  *  4/2003
JP    2018001567       1/2018

\* cited by examiner

LIGHT EMITTING DEVICE, EXPOSURE DEVICE, AND IMAGE FORMING APPARATUS

CROSS-REFERENCE TO RELATED APPLICATIONS

This application is based on and claims priority under 35 USC 119 from Japanese Patent Application No. 2020-160192 filed Sep. 24, 2020.

BACKGROUND

(i) Technical Field

The present invention relates to a light emitting device, an exposure device, and an image forming apparatus.

(ii) Related Art

An exposure device including a plate-shaped body portion that extends in one direction, a plurality of light emitting elements that are mounted on one surface of the body portion, a substrate that is mounted on the other surface of the body portion and has a heat generating element, which generates heat as the light emitting elements emit light, a resin housing that extends in the one direction, has a frame shape, in which a through-hole is formed, the through-hole having an inside fixed to the substrate such that a plate thickness direction of the substrate is a penetration direction of the through-hole, and a suppressing member that extends in the one direction, is fitted in the through-hole, and suppresses the thermal deformation of the housing is described in JP2018-001567A.

SUMMARY

Aspects of non-limiting embodiments of the present disclosure relate to, compared to a configuration where a fixing portion that fixes a housing and a suppressing member to each other is separated away from any one of a neutral axis of the housing or a light emitting unit, or the suppressing member in a light emitting direction, suppressing the deformation of the housing in the light emitting direction caused by heat.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light emitting device including a light emitting unit in which a resin housing extending in one direction holds a light emitting element emitting light in a light emitting direction intersecting the one direction, a suppressing member that extends in the one direction and suppresses deformation of the housing caused by heat, the suppressing member having a linear expansion coefficient different from a linear expansion coefficient of the housing, and a fixing portion that fixes the housing and the suppressing member to each other at a position overlapping, in the light emitting direction, a neutral axis of the housing or the light emitting unit or a neutral axis of the suppressing member in the light emitting direction, at a plurality of places separated away from each other in the one direction or in a state of extending in the one direction.

BRIEF DESCRIPTION OF THE DRAWINGS

Exemplary embodiment(s) of the present invention will be described in detail based on the following figures, wherein.

DETAILED DESCRIPTION

Examples of a light emitting device, an exposure device, and an image forming apparatus according to an exemplary embodiment of the present invention will be described with reference to FIGS. 1 to 9.

In the description below, an apparatus up-and-down direction (height direction), an apparatus width direction (horizontal direction), and an apparatus depth direction (horizontal direction) in a case where an image forming apparatus 10 is viewed from the front from a side where a user (not illustrated) stands will be described as an H-direction, a W-direction, and a D-direction, respectively. In addition, in a case where distinguishing between one side and the other side in each of the apparatus up-and-down direction is required, the apparatus width direction, and the apparatus depth direction, an upper side will be described as a +H side, a lower side will be described as a −H side, a right side will be described as a +W side, a left side will be described as a −W side, a back side will be described as a −D side, and a front side will be described as a +D side, in front view of the image forming apparatus 10.

Image Forming Apparatus 10

Figure 9:
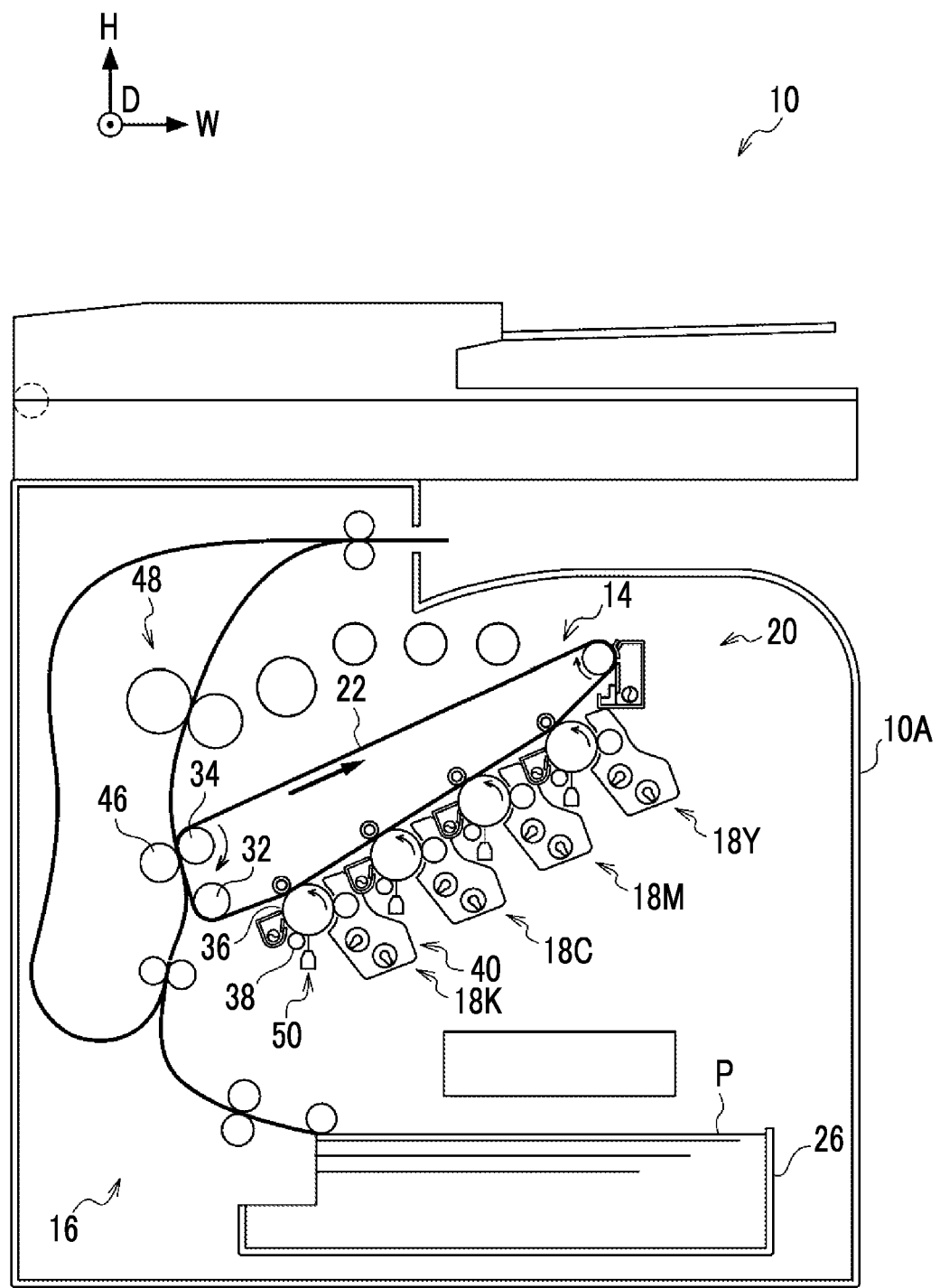
FIG. 9 is a schematic front view illustrating a configuration of an image forming apparatus according to the exemplary embodiment of the present invention.

The image forming apparatus 10 according to the present exemplary embodiment is an electrophotographic image forming apparatus that forms and fixes a toner image on a sheet member P, which is a recording medium. As illustrated in FIG. 9, the image forming apparatus 10 includes a housing 10A, which is an apparatus body, an accommodating unit 26, a transporting unit 16, and an image forming unit 20. The accommodating unit 26 has a function of accommodating the sheet member P. The transporting unit 16 has a function of transporting the sheet member P accommodated in the accommodating unit 26 to an image forming unit 20 side.

The image forming unit 20 has photoconductor units 18Y, 18M, 18C, and 18K, a transfer unit 14, and a fixing unit 48. "Y" at the end of the reference sign indicates that the photoconductor unit is for yellow, "M" is for magenta, "C" is for cyan, and "K" is for black.

The photoconductor units 18Y, 18M, 18C, and 18K are disposed inside the housing 10A in an arranged state in a case of being viewed from the front of the image forming apparatus 10. The photoconductor units 18Y, 18M, 18C, and 18K are configured the same except for a toner (not illustrated) to be used. For this reason, the reference sign showing the configuration of the photoconductor unit will be assigned with respect to the photoconductor unit 18K, and the photoconductor units 18Y, 18M, and 18C will be omitted. In addition, in a case where the photoconductor units 18Y, 18M, 18C, and 18K are not particularly distinguished, the alphabet letters at the end will be omitted.

The photoconductor unit 18 includes a photoconductor drum 36, a charging device 38, an exposure device 50, and a developing device 40. The photoconductor drum 36 is rotatably provided with a direction in which the image forming apparatus 10 is viewed from the front as an axial direction, and is rotated counterclockwise by a motor (not illustrated) in a case of being viewed from the front of the image forming apparatus 10. In addition, the photoconductor drum 36 has a function of holding an electrostatic latent image on an outer peripheral surface. The photoconductor drum 36 is an example of an image holder. The charging device 38 has a function of charging the outer peripheral surface of the photoconductor drum 36 to a potential determined in advance. The exposure device 50 is arranged at a position separated away from the photoconductor drum 36 by a distance determined in advance. The exposure device 50 has a function of forming an image of light on the charged photoconductor drum 36 to form an electrostatic latent image. The developing device 40 has a function of developing the electrostatic latent image formed on the photoconductor drum 36 with the use of a developing agent (not illustrated), including a toner, to form a toner image. Details of the exposure device 50 will be described later.

Figure 1:
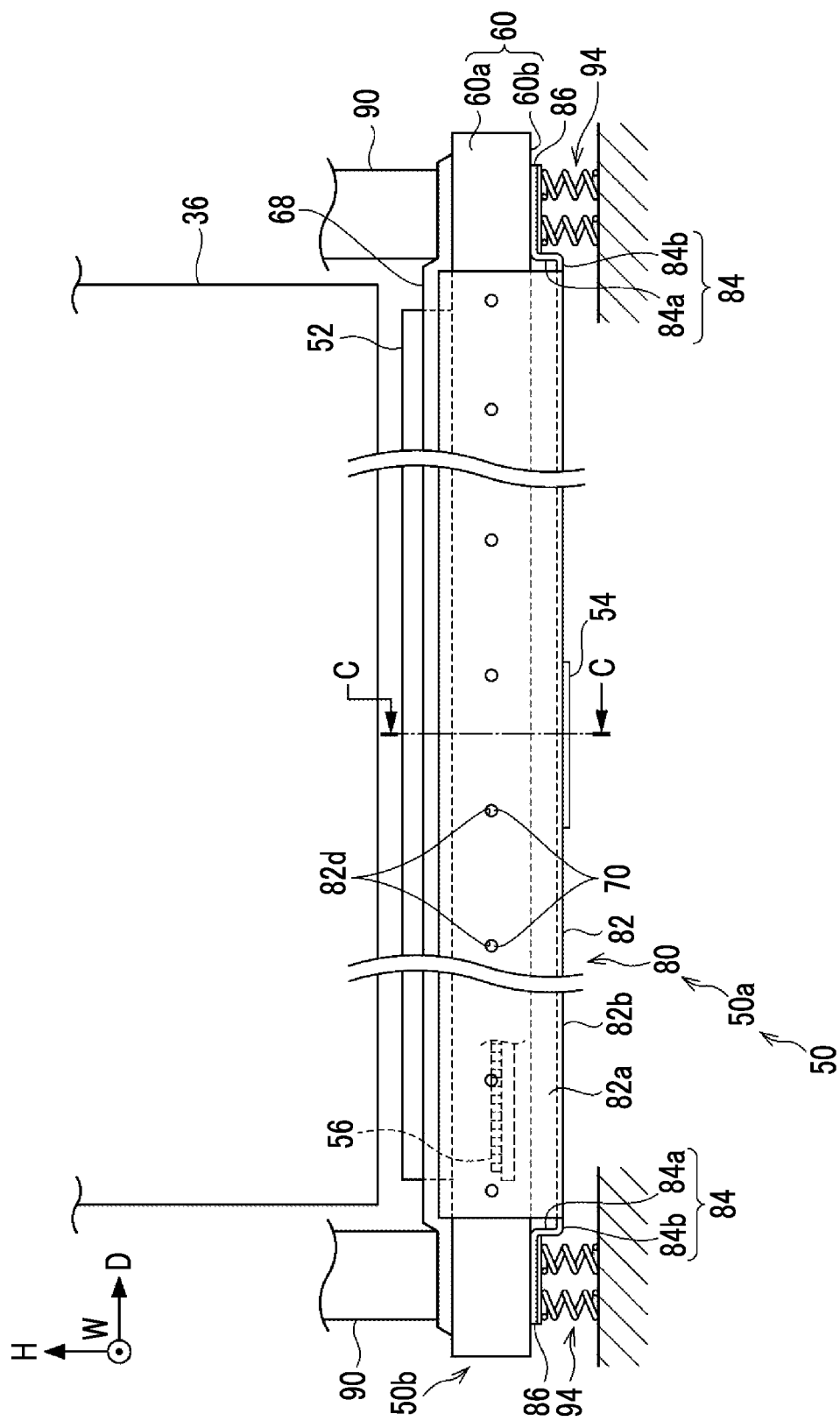
FIG. 1 is a side view of an exposure device according to an exemplary embodiment of the present invention.

In addition, as illustrated in FIG. 1, the photoconductor unit 18 further includes a positioning member 90 that comes into contact with an upper surface portion 68 of the exposure device 50, which is to be described later, and positions a position of the exposure device 50 with respect to the photoconductor drum 36. In addition, the photoconductor unit 18 further includes a biasing unit 94 that biases the exposure device 50 such that the upper surface portion 68 of the exposure device 50 comes into contact with the positioning member 90.

The transfer unit 14 is configured to include an intermediate transfer belt 22, a plurality of primary transfer rollers 44, a drive roller 32, a secondary transfer roller 34, and a facing roller 46. The intermediate transfer belt 22 is an endless belt of which an inner peripheral surface is supported by the primary transfer rollers 44, the drive roller 32, and the secondary transfer roller 34, and is moved around clockwise by the drive roller 32 in a case of being viewed from the front of the image forming apparatus 10.

The transfer unit 14 has a function of transferring, via the intermediate transfer belt 22, a toner image formed by the photoconductor units 18Y, 18M, 18C, and 18K on the sheet member P transported from the transporting unit 16 and transporting the sheet member to the fixing unit 48.

The fixing unit 48 has a function of fixing the toner image, which is transferred on the sheet member P by the transfer unit 14, on the sheet member P, and sends the sheet member P outside the apparatus.

Exposure Device 50

Next, the exposure device 50 will be described.

Figure 2:
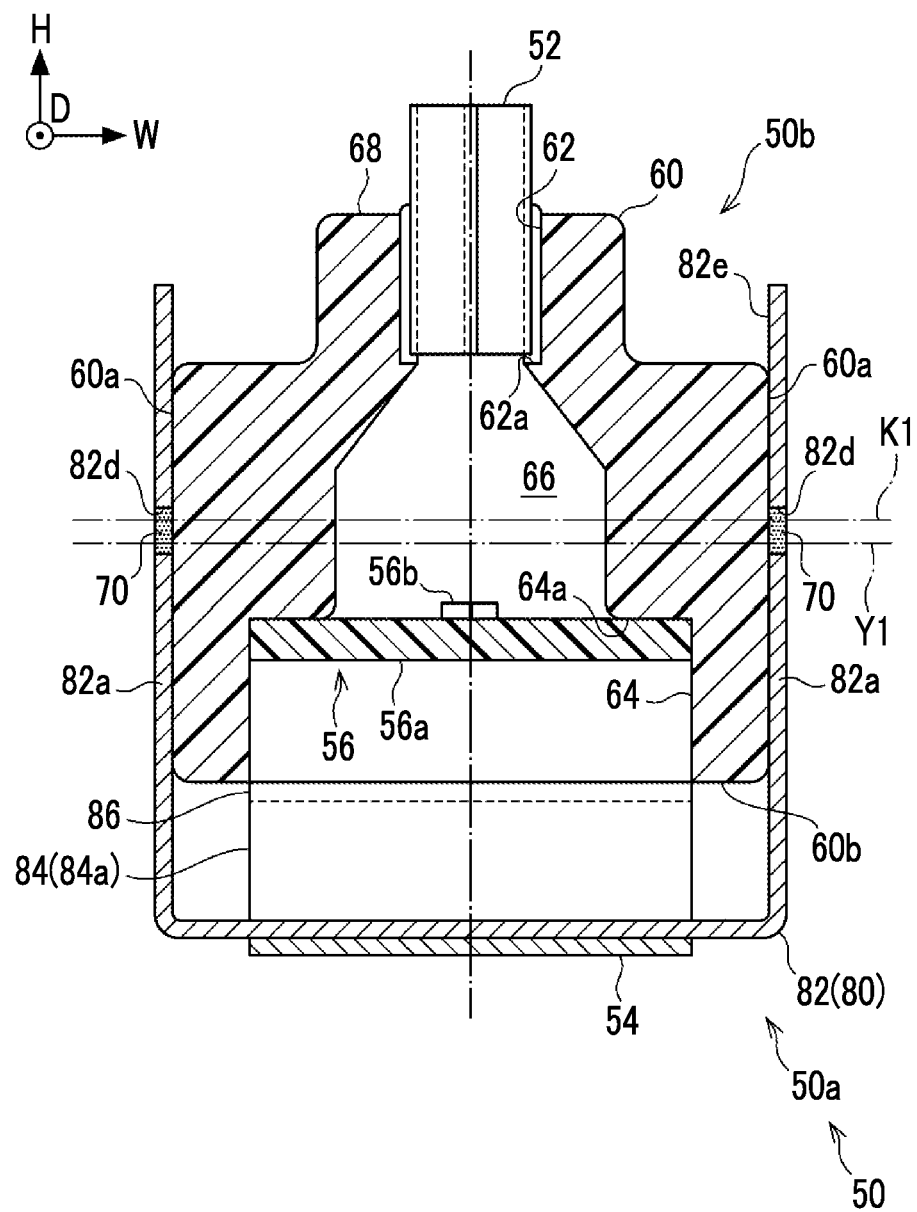
FIG. 2 is a sectional view taken along line C-C of FIG. 1.
Figure 3:
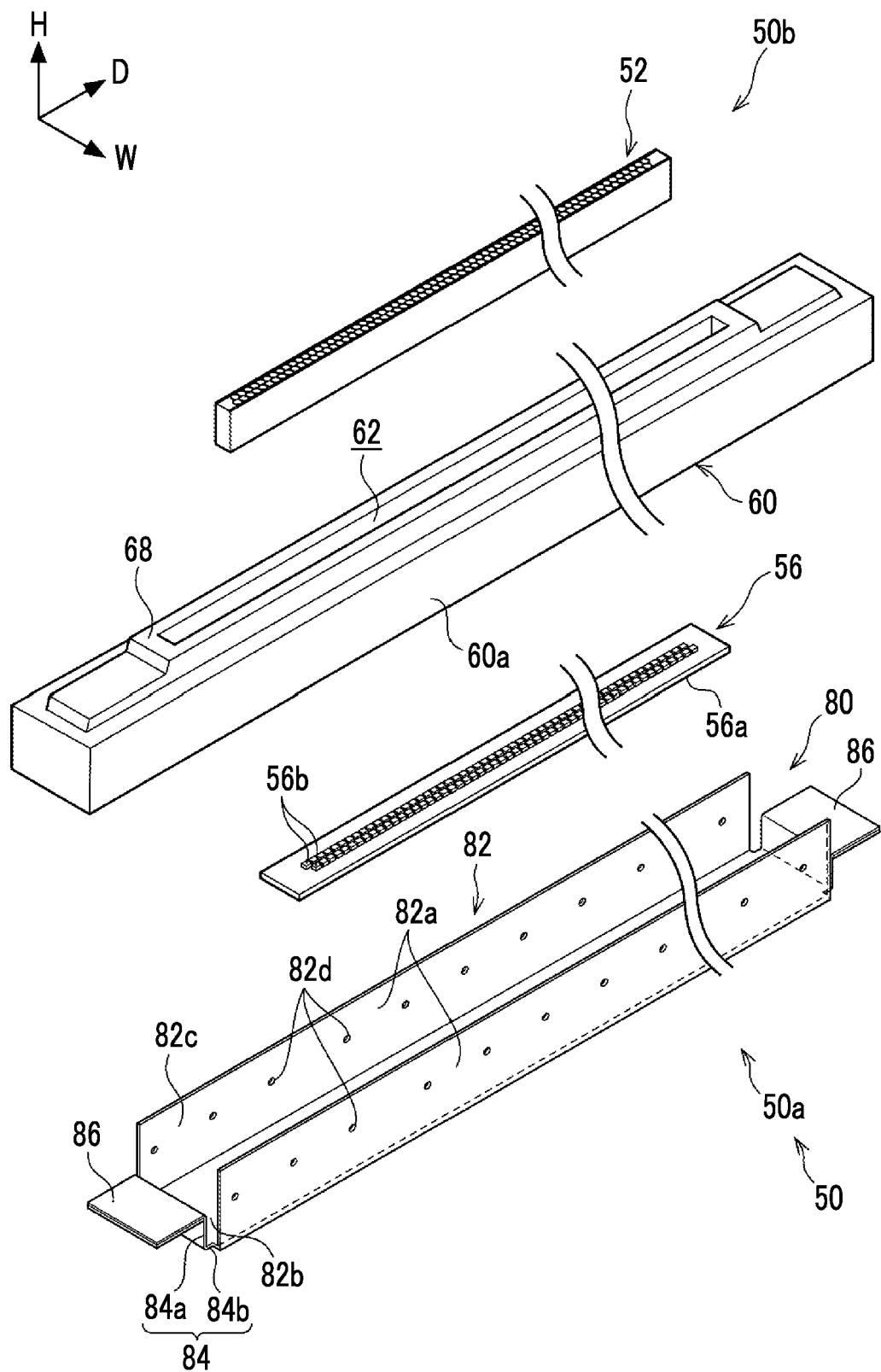
FIG. 3 is an exploded perspective view of the exposure device according to the exemplary embodiment of the present invention.

As illustrated in FIGS. 1 to 3, the exposure device 50 includes a light emitting device 50a and a weight 54. The light emitting device 50a includes a light emitting unit 50b, a suppressing member 80, and an adhesive 70. The light emitting unit 50b includes a housing 60, a light emitting substrate 56, and a lens array 52. As for description of the exposure device 50, the housing 60, the light emitting substrate 56, the lens array 52, the suppressing member 80, the adhesive 70, and the weight 54 will be described in this order.

Housing 60

As illustrated in FIGS. 1 and 3, the housing 60 is a resin member that extends in the apparatus depth direction and has the upper surface portion 68 and a lower surface portion 60b along the apparatus depth direction and the apparatus width direction. The housing 60 has a side surface portion 60a along the apparatus depth direction and the apparatus up-and-down direction. As illustrated in FIG. 2, in the housing 60, an upper recessed portion 62 that is recessed in a rectangular shape in the upper surface portion 68 of the housing 60 and has a bottom surface 62a along the apparatus depth direction and the apparatus width direction is formed. In addition, in the housing 60, a lower recessed portion 64 that is recessed in a rectangular shape in the lower surface portion 60b of the housing 60 and has a bottom surface 64a along the apparatus depth direction and the apparatus width direction is formed. Further, a through-hole 66 that penetrates through a space between the bottom surface 62a of the upper recessed portion 62 and the bottom surface 64a of the lower recessed portion 64 in the apparatus up-and-down direction is formed in the housing 60.

As illustrated in FIG. 1, a part of the upper surface portion 68 of the housing 60 on each of both end sides in the apparatus depth direction comes into contact with the positioning member 90 of the photoconductor unit 18. As the upper surface portion 68 of the housing 60 comes into contact with the positioning member 90 of the photoconductor unit 18, the position of the exposure device 50 with respect to the photoconductor drum 36 in the apparatus up-and-down direction is positioned.

A part of the lower surface portion 60b of the housing 60 on each of both end sides in the apparatus depth direction comes into contact with an end portion 86 of the suppressing member 80, which is to be described later. In addition, the lower surface portion 60b of the housing 60 is a part that receives a biasing force of the biasing unit 94 biasing the housing 60 via the end portion 86 to bring the upper surface portion 68 of the housing 60 into contact with the positioning member 90 of the photoconductor unit 18.

The reference sign K1 shown in FIG. 2 is a neutral axis of the housing 60 in the apparatus up-and-down direction. The neutral axis K1 is defined as an imaginary line of the housing 60 when a neutral surface, which is an imaginary surface where tensile stress and compressive stress attributable to bending moment applied to the housing 60 in the apparatus width direction do not occur, is viewed from the apparatus depth direction.

Light Emitting Substrate 56

As illustrated in FIG. 3, the light emitting substrate 56 includes a substrate body 56a and an LED array 56b.

The substrate body 56a is a rectangular plate member extending in the apparatus depth direction with the apparatus up-and-down direction as a thickness direction. The lengths of the substrate body 56a in the apparatus depth direction and the apparatus width direction are smaller than the lengths of the lower recessed portion 64 of the housing 60 in the apparatus depth direction and the apparatus width direction and larger than the lengths of the through-hole 66 in the apparatus depth direction and the apparatus width direction. In addition, the thickness of the substrate body 56a in the apparatus up-and-down direction is smaller than the depth of the lower recessed portion 64 in the apparatus up-and-down direction. As illustrated in FIG. 2, the substrate body 56a is fixed to the housing 60 with an adhesive in a state of being in contact with the bottom surface 64a of the lower recessed portion 64 to cover the through-hole 66 from below.

As illustrated in FIG. 3, the LED array 56b is a plurality of LEDs that are arranged and mounted in a zigzag pattern along the apparatus depth direction on an upper surface of the substrate body 56a and emit light upward. In other words, a light emitting direction of the LED array 56b is an upward direction. That is, the light emitting unit 50b, which is configured to include the light emitting substrate 56, including the LED array 56b, and the housing 60, emits light upward. Herein, the LEDs refer to light emitting diodes. The LED is an example of a light emitting element. The light emitting substrate 56 generates heat as the LED array 56b emits light (irradiation).

Lens Array 52

Figure 4:
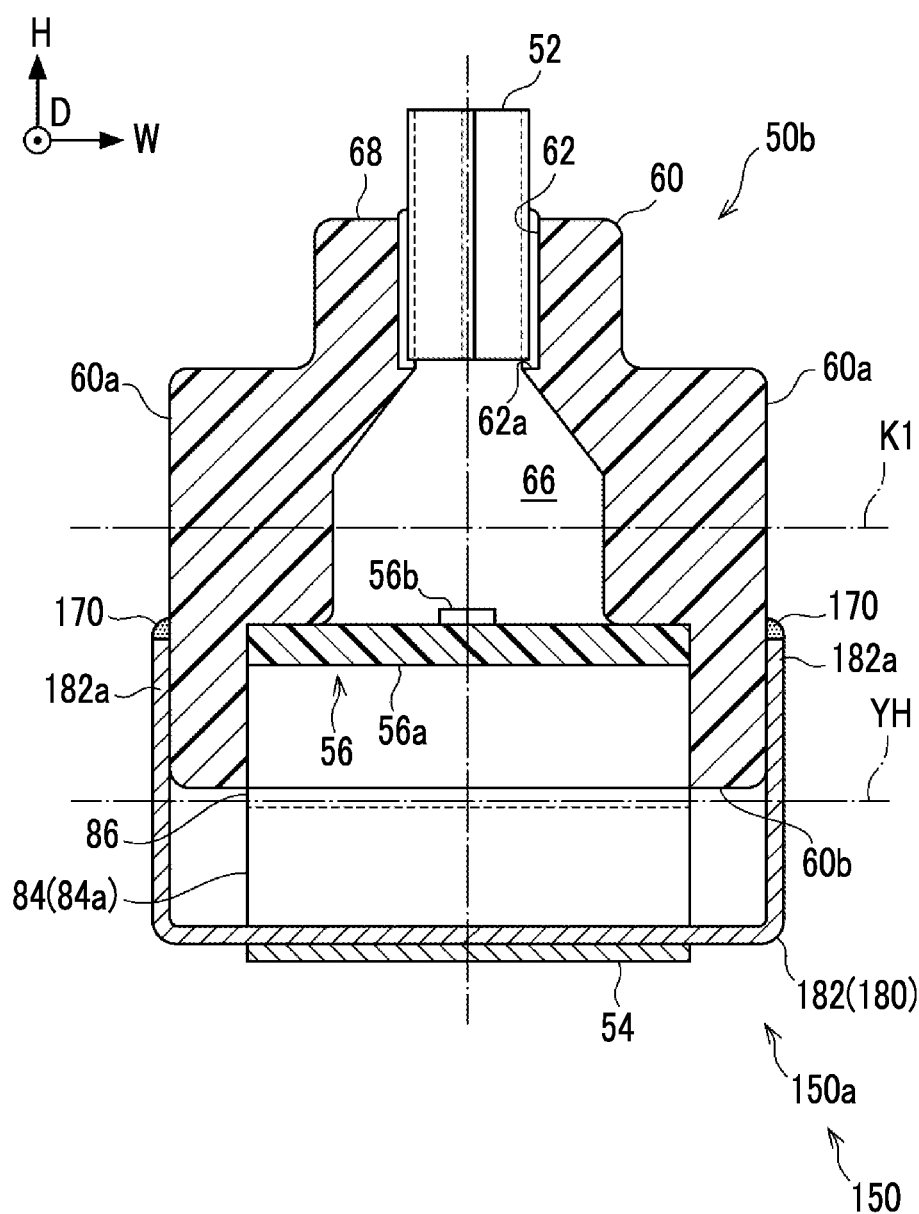
FIG. 4 is a front sectional view of an exposure device according to a comparative embodiment with respect to the exemplary embodiment of the present invention.

As illustrated in FIG. 2, the lens array 52 is a rectangular parallelepiped member extending in the apparatus depth direction. Specifically, the lens array 52 is configured such that a plurality of rod lenses (cylindrical lenses), of which optical axes are in the apparatus up-and-down direction, are arranged in the apparatus depth direction in a zigzag pattern to be sandwiched between two plate members, and are bonded with an adhesive. The length of the lens array 52 in the apparatus depth direction is smaller than the length of the upper recessed portion 62 of the housing 60 in the apparatus depth direction and is larger than the length of the through-hole 66 in the apparatus depth direction. In addition, the height of the lens array 52 in the apparatus up-and-down direction is larger than the depth of the upper recessed portion 62 in the apparatus up-and-down direction. As illustrated in FIGS. 3 and 4, the lens array 52 is arranged in the upper recessed portion 62 such that a part including an upper surface portion of the lens array 52 protrudes from the upper recessed portion 62 in a case of being viewed from the apparatus depth direction and a lower surface portion of the lens array 52 covers the through-hole 66 from above. In this state, the lens array 52 is fixed to the housing 60 with an adhesive. In addition, a gap between the upper recessed portion 62 and the lens array 52 is filled with a sealing agent 58 over the entire periphery of the lens array 52.

The lens array 52 is arranged such that each of the LEDs of the LED array 56b faces each rod lens of the lens array 52 at a position determined in advance. In addition, when the upper surface portion 68 of the housing 60 is contact with the positioning member 90 of the photoconductor unit 18, the lens array 52 is arranged such that the upper surface portion of the lens array 52 faces the photoconductor drum 36 at a position determined in advance. Accordingly, the exposure device 50 can form an image (expose) of light that is emitted from the LED array 56b and is transmitted through the lens array 52, at a target position determined in advance on a surface of the photoconductor drum 36. The lens array 52 is an example of an optical member. In addition, the photoconductor drum 36 is an example of an exposure target. The exposure device 50 has a function of forming an image of light emitted from the LED array 56b on the charged photoconductor drum 36 to form an electrostatic latent image on the photoconductor drum 36.

Suppressing Member 80

As illustrated in FIG. 3, the suppressing member 80 is a member that is formed of a sheet metal and extends in the apparatus depth direction. A linear expansion coefficient of the suppressing member 80 is larger than a linear expansion coefficient of the housing 60. That is, the linear expansion coefficient of the suppressing member 80 is different from the linear expansion coefficient of the housing 60. As illustrated in FIGS. 1 to 3, the suppressing member 80 is fixed to the housing 60 to cover the lower recessed portion 64 of the housing 60 from below. The suppressing member 80 has a body portion 82, a bent portion 84, and the end portion 86.

As illustrated in FIGS. 2 and 3, the body portion 82 is a part that has a U-shaped section open upward in a case of being viewed from the apparatus depth direction and extends in the apparatus depth direction. A pair of side walls and a bottom portion in the U-shaped section of the body portion 82 are referred to as side walls 82a and a bottom portion 82b, respectively. In addition, a part sandwiched between upper edges of the two side walls 82a is referred to as an opening portion 82c. As illustrated in FIGS. 1 and 2, the suppressing member 80 is arranged such that the bottom portion 82b of the body portion 82 is separated away from a lower surface of the housing 60 and the side surface portion 60a of the housing 60 is sandwiched between the pair of side walls 82a. That is, the width of the suppressing member 80 viewed from the apparatus width direction is larger than the width of the housing 60. In other words, a part of the housing 60 is arranged inside the suppressing member 80. In addition, the suppressing member 80 is arranged such that an edge portion (the upper edges of the side walls 82a) of the opening portion 82c is positioned above the neutral axis K1 of the housing 60. The entire housing 60 may be arranged inside the suppressing member 80.

As illustrated in FIGS. 1 and 2, a plurality of through-holes 82d that penetrate the side walls 82a in a plate thickness direction and are arranged in the apparatus depth direction are formed in the pair of side walls 82a at positions overlapping the neutral axis K1 of the housing 60 and a neutral axis Y1 (details thereof to be described later) of the suppressing member 80 in the apparatus up-and-down direction. The suppressing member 80 is fixed to the housing 60 with the adhesive 70 (details thereof to be described later) that is injected into the through-holes 82d of the pair of side walls 82a, between which the side surface portion 60a of the housing 60 is sandwiched, and is cured.

The bent portion 84 is a rectangular part in a case of being viewed from the apparatus depth direction, which is arranged at each of both end portions of the bottom portion 82b in the apparatus depth direction, and has an L-shaped section extending in the apparatus up-and-down direction and the apparatus depth direction in a case of being viewed from the apparatus width direction. The bent portion 84 has a leg portion 84a that stands in the apparatus up-and-down direction and a bottom portion 84b that extends from a lower end of the leg portion 84a in the apparatus depth direction. The bottom portion 84b of the bent portion 84 is connected to the bottom portion 82b of the body portion 82. In other words, two bent portions 84 are arranged such that the body portion 82 is sandwiched therebetween in the apparatus depth direction. In addition, the leg portion 84a of the bent portion 84 is separated away from the lower surface of the housing 60.

The end portion 86 is a rectangular part in a case of being viewed from the apparatus up-and-down direction, which is formed to spread from an upper end of the leg portion 84a toward an opposite side to the body portion 82 in a direction along the apparatus depth direction and the apparatus width direction. The suppressing member 80 is fixed to the housing 60 in a state where each of upper surfaces of the end portions 86 are in contact with the lower surface portion 60b of the housing 60. In addition, in a case of being viewed from the apparatus width direction, each of the end portions 86 overlaps each upper surface portion 68 of the housing 60 in the apparatus up-and-down direction.

As the body portion 82 is fixed to the housing 60 such that the side surface portion 60a of the housing 60 is sandwiched, the suppressing member 80 has a function of making the housing 60 extending in the apparatus depth direction difficult to bend in the apparatus up-and-down direction, compared to the housing 60 alone. That is, the suppressing member 80 has a function of suppressing the deformation of the housing 60.

The reference sign Y1 shown in FIG. 2 is a neutral axis of the suppressing member 80 in the apparatus up-and-down direction. The neutral axis Y1 is defined as an imaginary line of the suppressing member 80 when a neutral surface, which is an imaginary surface where tensile stress and compressive stress attributable to bending moment applied to the suppressing member 80 in the apparatus width direction do not occur, is viewed from the apparatus depth direction.

Adhesive 70

The adhesive 70 is injected into the plurality of through-holes 82d that are formed to be arranged along the apparatus depth direction in the side walls 82a of the suppressing member 80. By being injected into the plurality of through-holes 82d and being cured, the adhesive 70 of the present exemplary embodiment fixes the housing 60 and the suppressing member 80 to each other. That is, the adhesive 70 of the present exemplary embodiment fixes the housing 60 and the suppressing member 80 to each other in a form of being separated away from each other in the apparatus depth direction at a plurality of places. The adhesive 70 is an example of a fixing portion. In addition, the adhesive 70 of the present exemplary embodiment overlaps, in the apparatus up-and-down direction, both of the neutral axis K1 of the housing 60 and the neutral axis Y1 of the suppressing member 80 in the apparatus up-and-down direction. In other words, the adhesive 70 of the present exemplary embodiment is arranged below the edge portion of the opening portion 82c of the suppressing member 80. That is, the adhesive 70 of the present exemplary embodiment is arranged on an opposite side of a light emitting direction of the light emitting substrate 56 with respect to the edge portion of the opening portion 82c of the suppressing member 80.

As illustrated in FIGS. 1 and 2, the weight 54 is a member that has a rectangular parallelepiped shape extending in the apparatus depth direction and is fixed to a plate surface of the bottom portion 82b of the suppressing member 80, which is on an opposite side to the housing 60. As included in the exposure device 50, the weight 54 has a function of decreasing the natural frequency of the exposure device 50 compared to a case where the weight 54 is not included. Accordingly, the natural frequency of the exposure device 50 is deviated from the frequency of vibration generated inside the image forming apparatus 10.

Positioning Member 90

Each of the positioning members 90 is a member that is provided on a frame (not illustrated) of the image forming apparatus 10 and is arranged above the upper surface portion 68 of the housing 60. Each of the positioning members 90 has a contact surface 92 that is positioned at a position determined with respect to the photoconductor drum 36 in the apparatus up-and-down direction and faces downward. The positioning member 90 has a function of positioning the position of the exposure device 50 with respect to the photoconductor drum 36 in the apparatus up-and-down direction as the upper surface portion 68 of the housing 60 is brought into contact with the contact surface 92.

Biasing Unit 94

The biasing unit 94 is a mechanism configured to include, for example, a compression coil spring that is provided on the frame (not illustrated) of the image forming apparatus 10, is arranged below each of the end portions 86 of the suppressing member 80, and biases the end portion 86 upward. The biasing unit 94 has a contact surface 96 that comes into contact with a lower surface of each of the end portions 86. The biasing unit 94 has a function of coming into contact with the end portion 86 of the suppressing member 80 fixed to the housing 60 to bias the end portion 86 upward and biasing the lower surface portion 60b of the housing 60 via the end portion 86 to bring the upper surface portion 68 into contact with the contact surface 92 of the positioning member 90. In other words, the end portion 86 of the suppressing member 80 is interposed between the lower surface portion 60b of the housing 60 and the biasing unit 94.

Operations And Effects

Next, operations and effects of the exemplary embodiment will be described. In the description, in a case of using the same component as the image forming apparatus 10 of the exemplary embodiment when describing a comparative embodiment with respect to the exemplary embodiment, description will be made using the reference sign and the name of the component without a change.

The light emitting device 50a of exemplary embodiment has a configuration where the adhesive 70 fixes the housing 60 and the suppressing member 80 to each other at a position overlapping the neutral axis K1 of the housing 60 or the neutral axis Y1 of the suppressing member 80 in the apparatus up-and-down direction. The light emitting device 50a of the exemplary embodiment and a light emitting device 150a of the comparative embodiment to be described below will be compared to each other.

As illustrated in FIG. 4, the light emitting device 150a of the comparative embodiment includes a suppressing member 180 and an adhesive 170 instead of the suppressing member 80 and the adhesive 70 of the light emitting device 50a of the exemplary embodiment. In addition, the suppressing member 180 is arranged such that an upper end portion (an edge portion of an opening portion 182c) of a side wall 182a of a body portion 182 is positioned below the neutral axis K1 of the housing 60. The suppressing member 180 of the comparative embodiment is fixed to the housing 60 by the adhesive 170, which is applied to an upper edge of the opening portion 182c of the suppressing member 180 and the side surface portion 60a of the housing 60 in a form extending in the apparatus depth direction and is cured. That is, the adhesive 170 of the comparative embodiment fixes the housing 60 and the suppressing member 180 to each other at a position separated away from any one of the neutral axis K1 of the housing 60 or a neutral axis YH of the suppressing member 80 in the apparatus up-and-down direction. Except for the points above, the light emitting device 150a of the comparative embodiment is configured the same as the light emitting device 50a of the exemplary embodiment.

The housing 60 and the suppressing member 180 of the light emitting device 150a of the comparative embodiment is thermally deformed by heat as the light emitting device 150a emits light. In particular, the housing 60 and the suppressing member 180, which extend in the apparatus depth direction, are thermally deformed to expand in the apparatus depth direction. At this time, since a linear expansion coefficient of the suppressing member 180 is different from the linear expansion coefficient of the housing 60, deformation amounts in the apparatus depth direction caused by thermal deformation are different from each other. Specifically, the deformation amount of the suppressing member 180 having a linear expansion coefficient larger than the linear expansion coefficient of the housing 60 is larger than the deformation amount of the housing 60. In a case where the deformation amounts of the housing 60 and the suppressing member 180 in the apparatus depth direction caused by thermal deformation are different from each other, stress attributable to a difference between the deformation amounts of the housing 60 and the suppressing member 180, which are fixed to each other by the adhesive 170, occurs around the adhesive 170.

In the comparative embodiment, the adhesive 170 is separated away from the neutral axis K1 of the housing 60 in the apparatus up-and-down direction. For this reason, stress that has occurred around the adhesive 170 (a tensile force transmitted from the suppressing member 180 via the adhesive 170) acts on the housing 60 such that a lower side of the housing 60 warps in a protruding manner around the apparatus width direction. In addition, the adhesive 170 is separated away from the neutral axis YH of the suppressing member 180 in the apparatus up-and-down direction. For this reason, stress that has occurred around the adhesive 170 (a binding force transmitted from the housing 60 via the adhesive 170) acts on the suppressing member 180 such that a lower side of the suppressing member 180 warps in a protruding manner around the apparatus width direction. As described above, the housing 60, which extends in the apparatus depth direction and is fixed to the suppressing member 180 by the adhesive 170, is thermally deformed in the apparatus up-and-down direction by heat generated as the light emitting device 150a emits light.

On the other hand, the light emitting device 50a of the exemplary embodiment has a configuration where the adhesive 70 fixes the housing 60 and the suppressing member 80 to each other at a position overlapping, in the apparatus up-and-down direction, the neutral axis K1 of the housing 60 in the apparatus up-and-down direction. For this reason, the housing 60 of the exemplary embodiment is more unlikely to be warped by stress that has occurred around the adhesive 70 than the housing 60 of the comparative embodiment. In addition, the light emitting device 50a of the exemplary embodiment has a configuration where the adhesive 70 fixes the housing 60 and the suppressing member 80 to each other at a position overlapping the neutral axis Y1 of the suppressing member 80 in the apparatus up-and-down direction. For this reason, the suppressing member 80 of the exemplary embodiment is more unlikely to be warped by stress that has occurred around the adhesive 70 than the suppressing member 180 of the comparative embodiment. Accordingly, in the light emitting device 50a of the exemplary embodiment, the deformation of the housing 60 in the apparatus up-and-down direction caused by heat is suppressed, compared to a configuration where the adhesive that fixes the housing and the suppressing member to each other is separated away from any one of the neutral axis of the housing or the suppressing member in the apparatus up-and-down direction.

In addition, the light emitting device 50a of the exemplary embodiment has a configuration where the adhesive 70 overlaps, in the apparatus up-and-down direction, the neutral axis K1 of the housing 60 in the apparatus up-and-down direction. Accordingly, in the light emitting device 50a of the exemplary embodiment, the deformation of the housing 60 in the apparatus up-and-down direction caused by heat is suppressed, compared to a configuration where the adhesive that fixes the housing and the suppressing member to each other overlaps, in the apparatus up-and-down direction, only the neutral axis Y1 of the suppressing member 80 in the apparatus up-and-down direction.

In addition, the light emitting device 50a of the exemplary embodiment has a configuration where the adhesive 70 overlaps, in the apparatus up-and-down direction, both of the neutral axis K1 of the housing 60 or the neutral axis of the light emitting unit 50b and the neutral axis Y1 of the suppressing member in the apparatus up-and-down direction. Accordingly, in the light emitting device 50a of the exemplary embodiment, the deformation of the housing 60 in the apparatus up-and-down direction caused by heat is suppressed, compared to a configuration where the adhesive that fixes the housing and the suppressing member to each other overlaps, in the apparatus up-and-down direction, only the neutral axis of the housing in the apparatus up-and-down direction.

In addition, the light emitting device 50a of the exemplary embodiment has a configuration where the width of the suppressing member 80 is larger than the width of the housing 60 in a case of being viewed from the apparatus depth direction. In a case where the width of the suppressing member 80 in the apparatus depth direction is large, the function of the suppressing member 80, which suppresses the deformation of the housing 60, improves. Accordingly, in the light emitting device 50a of the exemplary embodiment, the warping of the housing 60 is suppressed, compared to a configuration where the width of the suppressing member is smaller than the width of the housing 60 in a case of being viewed from the apparatus depth direction.

In addition, the light emitting device 50a of the exemplary embodiment has a configuration where the adhesive 70 is arranged below the edge portion of the opening portion 82c of the suppressing member 80. That is, the light emitting device 50a of the exemplary embodiment has a small distance separated away from the neutral axis Y1 of the suppressing member 80 in the apparatus up-and-down direction, compared to a configuration where the adhesive is arranged only above the edge portion of the opening portion 82c of the suppressing member 80. Accordingly, in the light emitting device 50a of the exemplary embodiment, the deformation of the housing 60 in the apparatus up-and-down direction caused by heat is suppressed, compared to a configuration where the adhesive is arranged only above the edge portion of the opening portion 82c of the suppressing member 80.

In addition, in the exposure device 50 including the light emitting device 50a of the exemplary embodiment, exposure failure is suppressed, compared to a configuration where the adhesive that fixes the housing and the suppressing member to each other is separated away, in the apparatus up-anddown direction, from any one of the neutral axis of the housing or the suppressing member in the apparatus up-and-down direction.

In addition, in the image forming apparatus 10 including the exposure device 50 of the exemplary embodiment, image formation failure is suppressed, compared to a configuration where the adhesive that fixes the housing and the suppressing member to each other is separated away, in the apparatus up-and-down direction, from any one of the neutral axis of the housing or the suppressing member in the apparatus up-and-down direction.

As described above, although the specific exemplary embodiment of the present invention has been described in detail, the present invention is not limited to the exemplary embodiment, and can undergo various deformations, changes, and improvements without departing from the technical scope of the present invention.

For example, the light emitting device 50a of the exemplary embodiment is configured such that the adhesive 70 overlaps, in the apparatus up-and-down direction, the neutral axis K1 of the housing 60 in the apparatus up-and-down direction. However, the adhesive 70 of the exemplary embodiment may have a configuration of overlapping, in the apparatus up-and-down direction, the neutral axis of the light emitting unit 50b, which is configured to include the housing 60, the light emitting substrate 56, and the lens array 52, in the apparatus up-and-down direction, instead of the neutral axis K1 of the housing 60. The neutral axis of the light emitting unit 50b in the apparatus up-and-down direction is defined as an imaginary line of the light emitting unit 50b when a neutral surface, which is an imaginary surface where tensile stress and compressive stress attributable to bending moment applied to the light emitting unit 50b in the apparatus width direction do not occur, is viewed from the apparatus depth direction. The light emitting device having the configuration operates the same as the light emitting device 50a of the exemplary embodiment. That is, in the light emitting device having the configuration, the deformation of the housing in the apparatus up-and-down direction caused by heat is suppressed, compared to a configuration where the adhesive that fixes the housing and the suppressing member to each other is separated away from any one of the neutral axis of the housing or the light emitting unit, or the suppressing member in the apparatus up-and-down direction. In the present invention, a combination of the housing 60 and the light emitting substrate 56 may be regarded as an example of the light emitting unit.

In addition, the light emitting device 50a of the exemplary embodiment has a configuration where the adhesive 70 overlaps, in the apparatus up-and-down direction, both of the neutral axis K1 of the housing 60 and the neutral axis Y1 of the suppressing member 80 in the apparatus up-and-down direction. However, the light emitting device according to the exemplary embodiment of the present invention may be configured such that the adhesive, which fixes the housing and the suppressing member to each other, overlaps, in the apparatus up-and-down direction, only any one of the neutral axis of the housing or the light emitting unit, or the neutral axis of the suppressing member in the apparatus up-and-down direction. As the specific example, a light emitting device 450a, which is an example of the light emitting device according to the exemplary embodiment of the present invention, will be described below.

Figure 5:
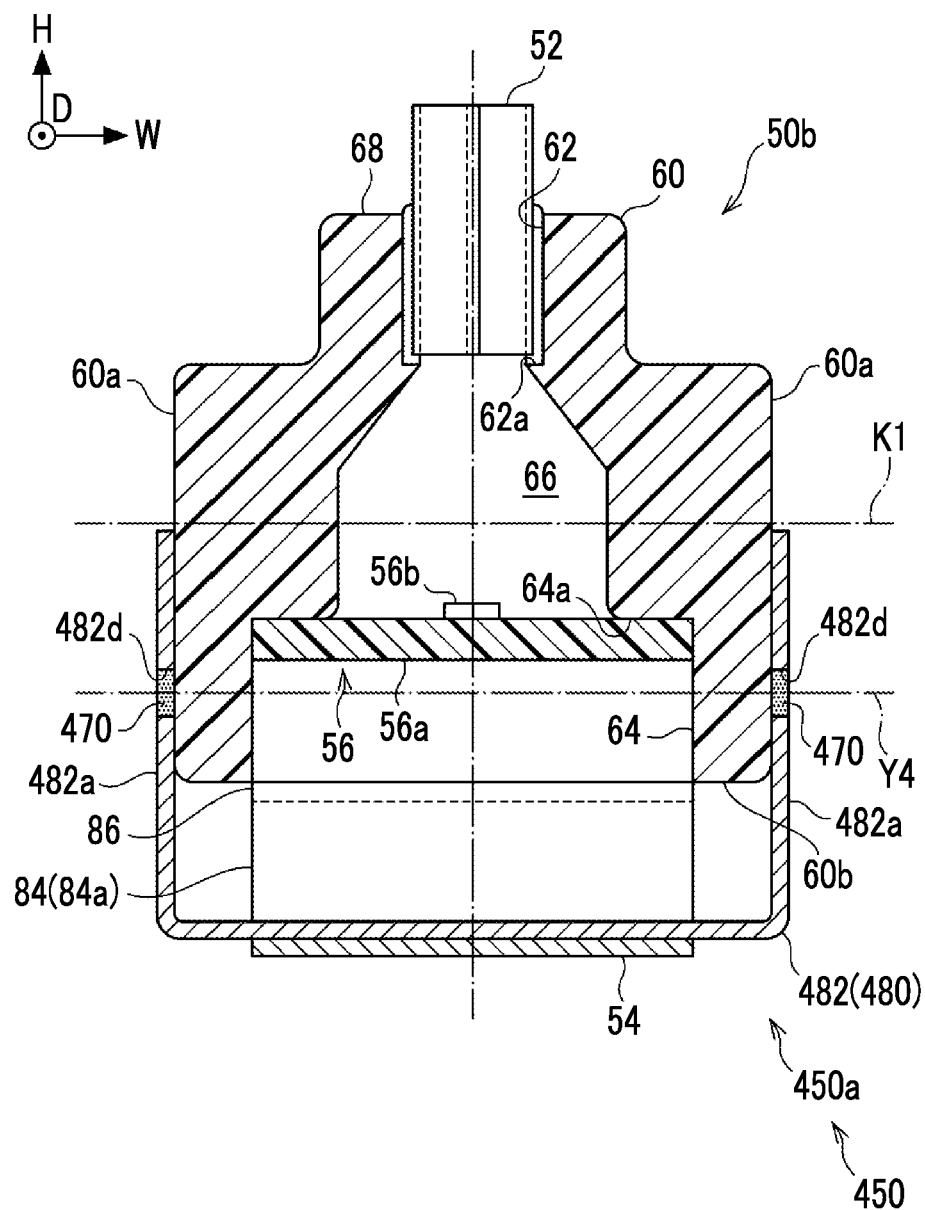
FIG. 5 is a front sectional view of an exposure device according to a modification example of the exemplary embodiment of the present invention.

As illustrated in FIG. 5, the light emitting device 450a includes a suppressing member 480 and an adhesive 470 instead of the suppressing member 80 and the adhesive 70 of the light emitting device 50a of the exemplary embodiment. A neutral axis Y4 of the suppressing member 480 in the apparatus up-and-down direction is positioned below the neutral axis Y1 of the suppressing member 80 of the exemplary embodiment. Instead of the through-holes 82d of the suppressing member 80, the suppressing member 480 has a through-hole 482d at a position overlapping a neutral axis, which is the neutral axis Y4 of the suppressing member 480, in the apparatus up-and-down direction. By being injected into the through-hole 482d of the suppressing member 480 and being cured, the adhesive 470 fixes the housing 60 and the suppressing member 480 to each other. That is, the adhesive 470 overlaps, in the apparatus up-and-down direction, the neutral axis Y4 of the suppressing member 480 in the apparatus up-and-down direction. The adhesive 470 is an example of the fixing portion. Except for the points above, the light emitting device 450a is configured the same as the light emitting device 50a of the exemplary embodiment.

In addition, in the light emitting device 50a of the exemplary embodiment, the adhesive 70 is injected into the through-holes 82d formed in the suppressing member 80. However, insofar as the adhesive according to the exemplary embodiment of the present invention, which fixes the housing and the suppressing member to each other, overlaps, in the apparatus up-and-down direction, the neutral axis of the housing or the light emitting unit, or the neutral axis of the suppressing member in the apparatus up-and-down direction, the adhesive is not limited to a form of being injected in the through-holes formed in the suppressing member. As the specific example, a light emitting device 250a and a light emitting device 350a, which are examples of the light emitting device according to the exemplary embodiment of the present invention, will be described below.

Figure 6:
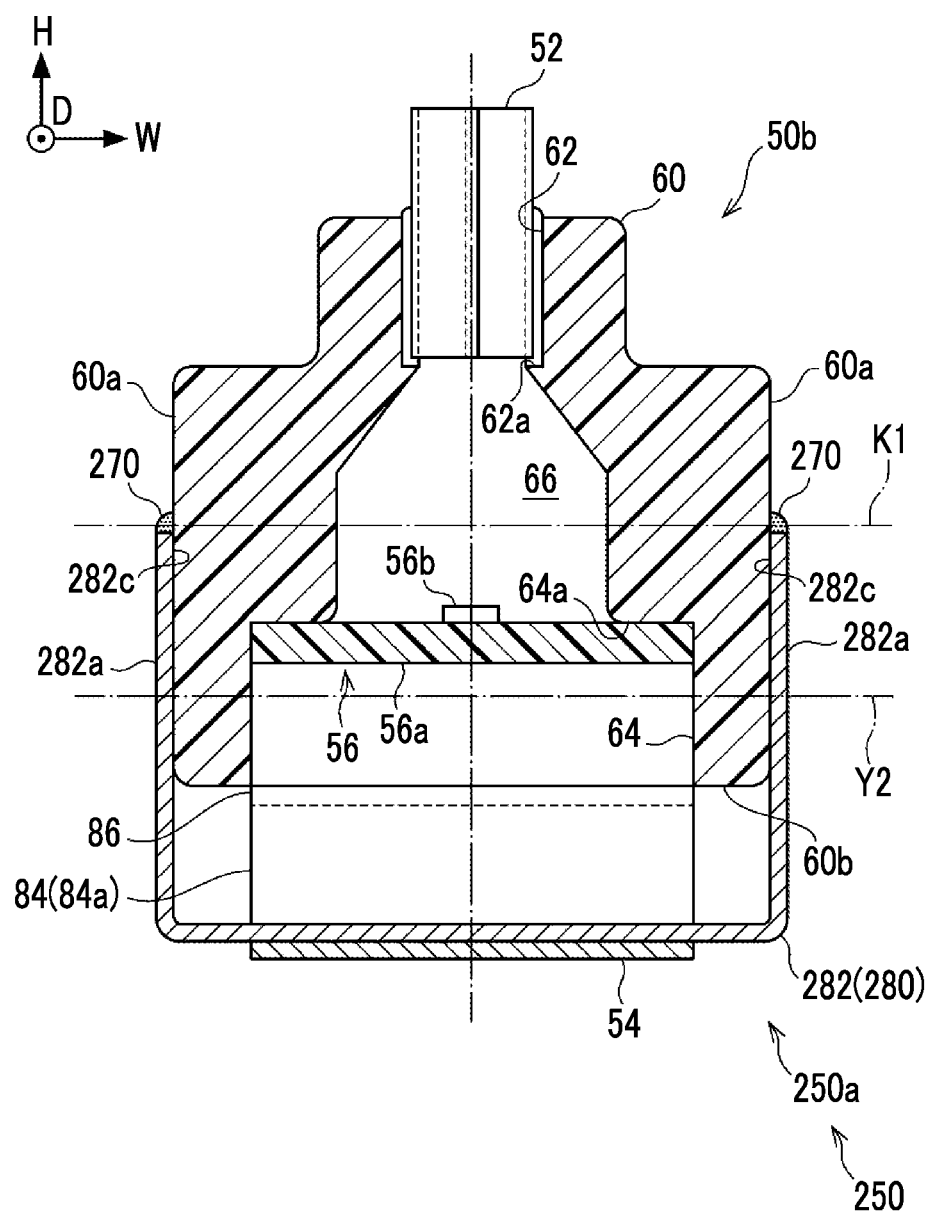
FIG. 6 is a front sectional view of an exposure device according to another modification example of the exemplary embodiment of the present invention.

As illustrated in FIG. 6, the light emitting device 250a includes a suppressing member 280 and an adhesive 270 instead of the suppressing member 80 and the adhesive 70 of the light emitting device 50a of the exemplary embodiment. A neutral axis Y2 of the suppressing member 280 in the apparatus up-and-down direction is positioned below the neutral axis Y1 of the suppressing member 80 of the exemplary embodiment. In addition, an upper edge of an opening portion 282c of a body portion 282 of the suppressing member 280 is positioned above the neutral axis Y2 of the suppressing member 280 and below the neutral axis K1 of the housing 60. In addition, the through-holes 82d are not formed in the suppressing member 280. The adhesive 270 fixes the housing 60 and the suppressing member 280 to each other by being applied to the upper edge of the opening portion 282c of the suppressing member 280 and the side surface portion 60a of the housing 60 in a state of extending in the apparatus depth direction and being cured to overlap the neutral axis K1 of the housing 60 in the apparatus up-and-down direction. The adhesive 270 is an example of the fixing portion. Except for the points above, the light emitting device 250a is configured the same as the light emitting device 50a of the exemplary embodiment.

Figure 7:
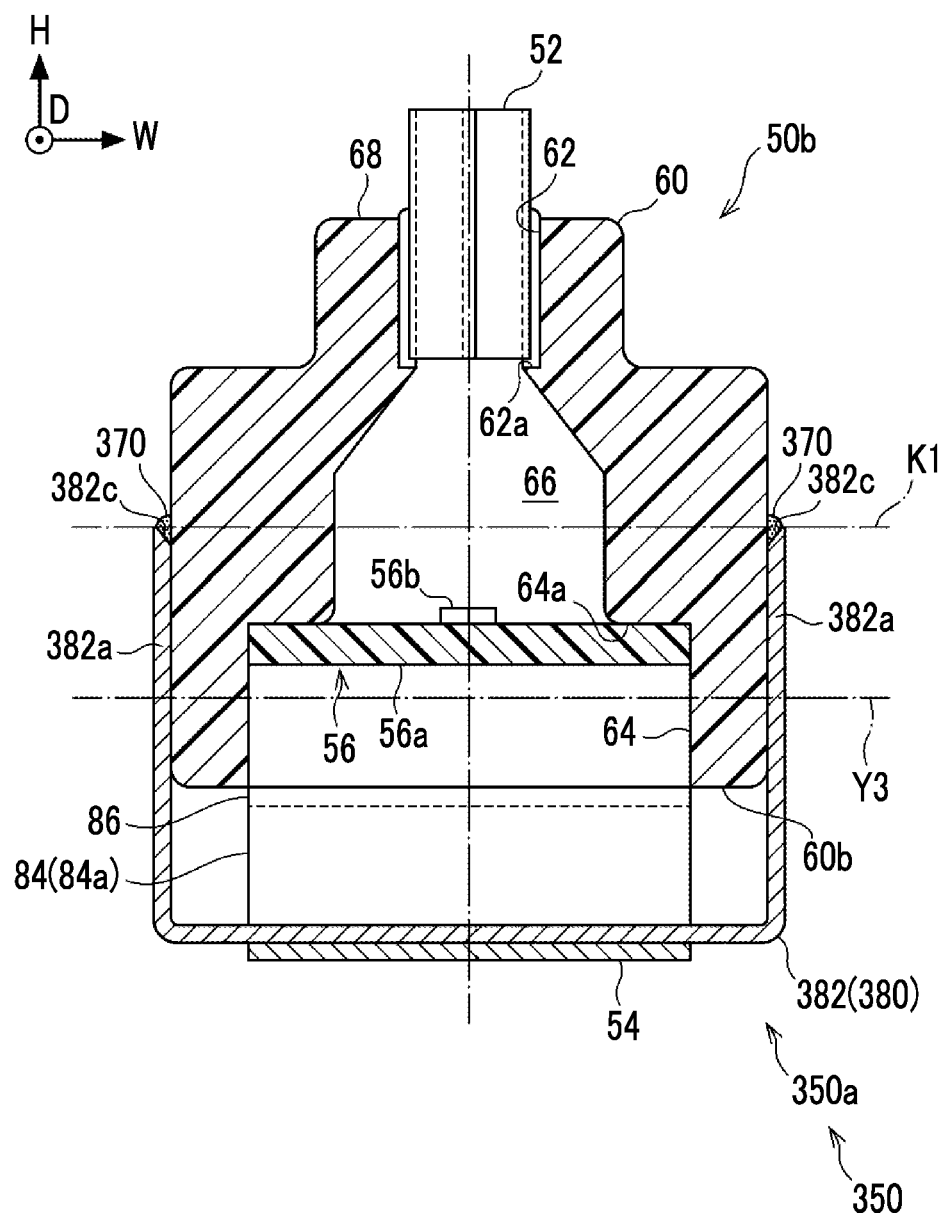
FIG. 7 is a front sectional view of an exposure device according to still another modification example of the exemplary embodiment of the present invention.

In addition, as illustrated in FIG. 7, the light emitting device 350a includes a suppressing member 380 and an adhesive 370 instead of the suppressing member 280 and the adhesive 270 of the light emitting device 250a. An upper edge of an opening portion 382c of a body portion 382 of the suppressing member 380 is inclined to spread upward from an inner wall side to an outer wall side of the suppressing member. Accordingly, a gap between the upper edge of the opening portion 382c of the suppressing member 380 and the side surface portion 60a of the housing 60 is formed. The suppressing member 380 is arranged such that the gap formed between the upper edge of the opening portion 382c and the side surface portion 60a of the housing 60 overlaps the neutral axis K1 of the housing 60 in the apparatus up-and-down direction. The adhesive 370 fixes the housing 60 and the suppressing member 380 to each other by being applied to the gap formed between the upper edge of the opening portion 382c of the suppressing member 380 and the side surface portion 60a of the housing 60 in a state of extending in the apparatus depth direction and being cured. That is, the adhesive 370 overlaps, in the apparatus up-and-down direction, the neutral axis K1 of the housing 60 in the apparatus up-and-down direction. The adhesive 370 is an example of the fixing portion. Except for the points above, the light emitting device 350a is configured the same as the light emitting device 250a.

In addition, in the light emitting device 50a of the exemplary embodiment, the width of the suppressing member 80 in a case of being viewed from the apparatus depth direction is larger than the housing 60. However, insofar as the adhesive that fixes the housing and the suppressing member to each other, overlaps, in the apparatus up-and-down direction, the neutral axis of the housing or the light emitting unit, or the neutral axis of the suppressing member in the apparatus up-and-down direction, the suppressing member according to the exemplary embodiment of the present invention may have a width in a case of being viewed from the apparatus depth direction smaller than the housing. As the specific example, a light emitting device 550a, which is an example of the light emitting device according to the exemplary embodiment of the present invention, will be described below.

Figure 8:
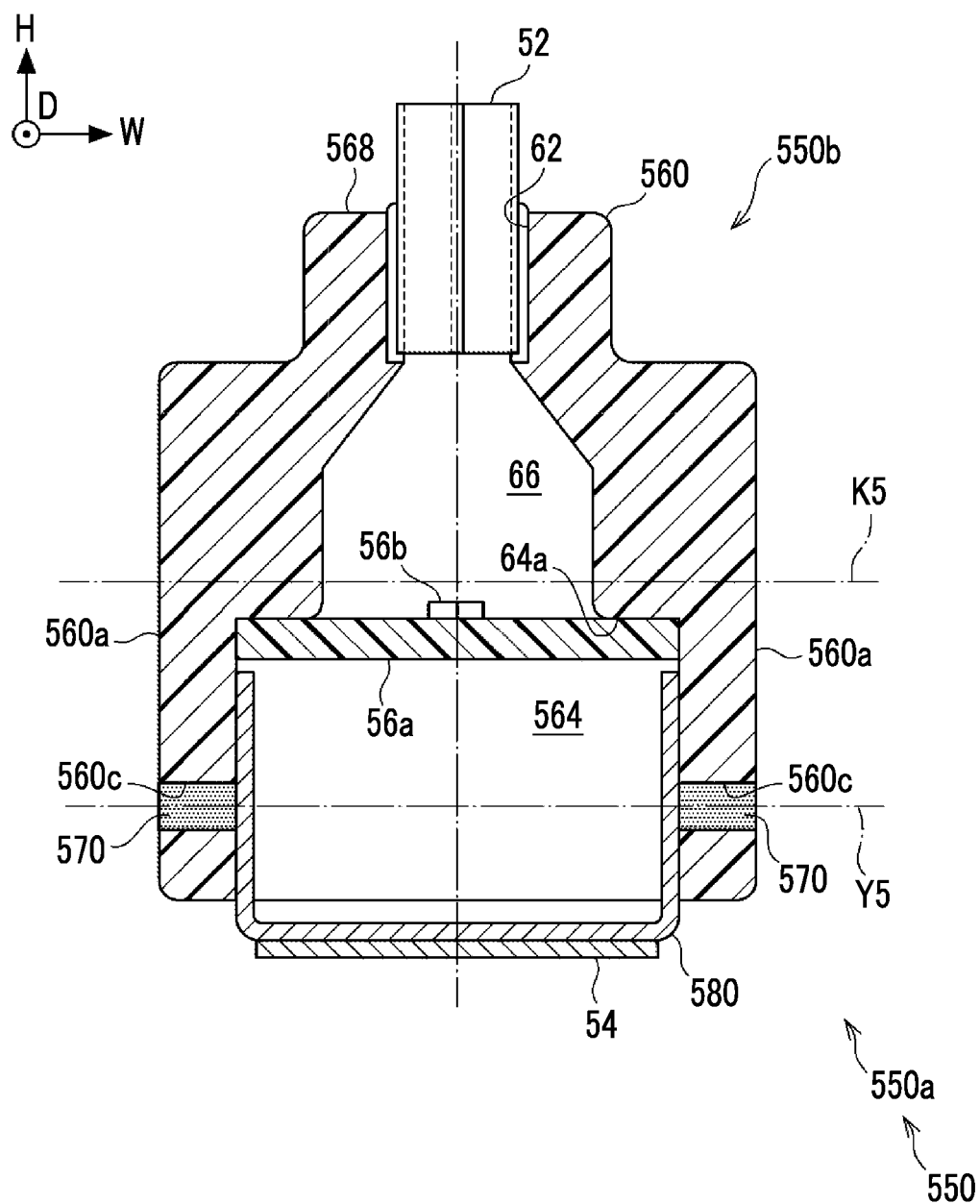
FIG. 8 is a front sectional view of an exposure device according to still another modification example of the exemplary embodiment of the present invention.

As illustrated in FIG. 8, the light emitting device 550a includes a housing 560, a suppressing member 580, and an adhesive 570 instead of the housing 60, the suppressing member 80, and the adhesive 70 of the light emitting device 50a of the exemplary embodiment. A plurality of through-holes 560c that penetrate side surface portions 560a on a lower recessed portion 564 side in the apparatus width direction are formed in the housing 560 to be arranged along the apparatus depth direction. A neutral axis K5 the housing 560 in the apparatus up-and-down direction is positioned above the through-holes 560c. The suppressing member 580 has a width in a case of being viewed from the apparatus depth direction smaller than the housing 560 and has a size to be able to be fitted into a lower recessed portion 564. The suppressing member 580 is arranged to be in contact with and is sandwiched between the side surface portions 560a of the housing 560 on a lower recessed portion 64 side such that a neutral axis Y5 in the apparatus up-and-down direction overlaps the through-holes 560c of the housing 560. That is, the neutral axis Y5 of the suppressing member 580 is positioned below the neutral axis K5 of the housing 560. In addition, the suppressing member 580 does not have parts corresponding to the bent portion 84 and the end portion 86 of the suppressing member 80 in the exemplary embodiment. By being injected into the through-holes 560c of the housing 560 and being cured, the adhesive 570 fixes the housing 560 and the suppressing member 580 to each other. That is, the adhesive 570 overlaps, in the apparatus up-and-down direction, the neutral axis Y5 of the suppressing member 580 in the apparatus up-and-down direction. The adhesive 570 is an example of the fixing portion. Except for the points above, the light emitting device 550a is configured the same as the light emitting device 50a.

In addition, the light emitting device 50a of the exemplary embodiment has a U-shaped section in which the suppressing member 80 is open upward in a case of being viewed from the apparatus depth direction. However, insofar as the adhesive that fixes the housing and the suppressing member to each other overlaps, in the apparatus up-and-down direction, the neutral axis of the housing or the light emitting unit, or the neutral axis of the suppressing member in the apparatus up-and-down direction, the suppressing member according to the exemplary embodiment of the present invention is not limited to having a U-shaped section. For example, insofar as the neutral axis of the suppressing member 580 overlaps the through-holes 560c of the housing 560, the suppressing member 580 of the light emitting device 550a described above may have a hollow closed section formed by bending a thin plate, or may have a solid section.

In addition, in the light emitting device 50a of the exemplary embodiment, the adhesive 70 is arranged below the opening portion 82c of the suppressing member 80. However, the adhesive according to the exemplary embodiment of the present invention, which fixes the housing and the suppressing member to each other, may be arranged above the upper edge of the opening portion of the suppressing member having a U-shaped section open upward in a case of being viewed from the apparatus depth direction, as in the light emitting device 250a described above. In addition, the adhesive according to the exemplary embodiment of the present invention, which fixes the housing and the suppressing member to each other, may be arranged to overlap, in the apparatus up-and-down direction, the upper edge of the opening portion of the suppressing member having a U-shaped section open upward in a case of being viewed from the apparatus depth direction, as in the light emitting device 350a described above.

In addition, the suppressing member 80 of the light emitting device 50a of the exemplary embodiment includes the bent portion 84 and the end portion 86. However, the suppressing member according to the exemplary embodiment of the present invention may be configured to have no parts corresponding to the bent portion 84 and the end portion 86 of the suppressing member 80 according to the exemplary embodiment, as in the suppressing member 580 of the light emitting device 550a described above. That is, the housing according to the exemplary embodiment of the present invention may be configured to directly receive a biasing force generated by the biasing unit 94 without going through the suppressing member 80.

In addition, the light emitting device 50a of the exemplary embodiment has a configuration where the suppressing member 80 covers the lower recessed portion 64 of the housing 60 from below. However, the suppressing member according to the exemplary embodiment of the present invention may be shorter than the lower recessed portion 64 of the housing 60 in the apparatus depth direction.

In addition, the light emitting device 50a of the exemplary embodiment includes the adhesive 70 as an example of the fixing portion that fixes the housing and the suppressing member to each other. However, the fixing portion according to the exemplary embodiment of the present invention is not limited to the adhesive, and may be configured to perform fixing by fastening the housing and the suppressing member to each other with a fastening member, for example, a bolt and a nut.

In addition, the light emitting device 50a of the exemplary embodiment is arranged below the photoconductor drum 36. However, insofar as an image of light emitted by the light emitting device 50a can be formed (exposed) on the surface of the photoconductor drum 36, the light emitting device 50a according to the exemplary embodiment of the present invention may be arranged above the photoconductor drum 36 or may be arranged on the side of the photoconductor drum 36.

In addition, the light emitting device 50a of the exemplary embodiment is included in the exposure device 50 that forms an image of light on the charged photoconductor drum 36 to form an electrostatic latent image. However, the light emitting device according to the exemplary embodiment of the present invention is not limited to the light emitting device included in the exposure device. For example, the light emitting device according to the exemplary embodiment of the present invention may be included in a reading unit (for example, a contact image sensor).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light emitting device comprising:
a light emitting unit in which a resin housing extending in one direction holds a light emitting element emitting light in a light emitting direction intersecting the one direction;
a suppressing member that extends in the one direction and suppresses deformation of the housing caused by heat, the suppressing member having a linear expansion coefficient different from a linear expansion coefficient of the housing; and
a fixing portion that fixes the housing and the suppressing member to each other at a position overlapping, in the light emitting direction, a neutral axis of the housing or the light emitting unit or a neutral axis of the suppressing member in the light emitting direction, at a plurality of places separated away from each other in the one direction or in a state of extending in the one direction,
wherein the fixing portion overlaps the neutral axis of the housing or the light emitting unit in the light emitting direction.

2. The light emitting device according to claim 1,
wherein the fixing portion overlaps both of the neutral axis of the housing or the light emitting unit and the neutral axis of the suppressing member in the light emitting direction.

3. A light emitting device comprising:
a light emitting unit in which a resin housing extending in one direction holds a light emitting element emitting light in a light emitting direction intersecting the one direction;
a suppressing member that extends in the one direction and suppresses deformation of the housing caused by heat, the suppressing member having a linear expansion coefficient different from a linear expansion coefficient of the housing; and
a fixing portion that fixes the housing and the suppressing member to each other at a position overlapping, in the light emitting direction, a neutral axis of the housing or the light emitting unit or a neutral axis of the suppressing member in the light emitting direction, at a plurality of places separated away from each other in the one direction or in a state of extending in the one direction,
wherein the suppressing member has a width larger than a width of the housing in a case of being viewed from the one direction.

4. The light emitting device according to claim 1,
wherein the suppressing member has a width larger than a width of the housing in a case of being viewed from the one direction.

5. The light emitting device according to claim 2,
wherein the suppressing member has a width larger than a width of the housing in a case of being viewed from the one direction.

6. The light emitting device according to claim 3,
wherein the suppressing member has an opening portion open in the light emitting direction,
at least a part of the housing is arranged inside the suppressing member, and
the fixing portion is arranged on an opposite side of the light emitting direction with respect to an edge portion of the opening portion.

7. The light emitting device according to claim 4,
wherein the suppressing member has an opening portion open in the light emitting direction,
at least a part of the housing is arranged inside the suppressing member, and
the fixing portion is arranged on an opposite side of the light emitting direction with respect to an edge portion of the opening portion.

8. The light emitting device according to claim 5,
wherein the suppressing member has an opening portion open in the light emitting direction,
at least a part of the housing is arranged inside the suppressing member, and
the fixing portion is arranged on an opposite side of the light emitting direction with respect to an edge portion of the opening portion.

9. An exposure device comprising:
the light emitting device according to claim 1; and
an optical member that is fixed to the housing and constitutes the light emitting unit, the optical member exposing an exposure target to light emitted by the light emitting device.

10. An image forming apparatus comprising:
an image holder;
the exposure device according to claim 9 that forms an image of light on the charged image holder to form an electrostatic latent image; and
a developing device that develops the electrostatic latent image on the image holder to form an image.

* * * * *